UNITED STATES PATENT OFFICE.

WILLIAM H. PISANI, OF SAN FRANCISCO, CALIFORNIA, ASSIGNOR TO MAX J. BRANDENSTEIN, MANFRED BRANDENSTEIN, AND EDWARD BRANDENSTEIN, ALL OF SAN FRANCISCO, CALIFORNIA, COPARTNERS DOING BUSINESS UNDER THE FIRM-NAME OF M. J. BRANDENSTEIN & CO., OF SAN FRANCISCO, CALIFORNIA.

PROCESS OF PACKING COFFEE.

1,347,791.     Specification of Letters Patent.     Patented July 27, 1920.

No Drawing.     Application filed March 3, 1917. Serial No. 152,364.

*To all whom it may concern:*

Be it known that I, WILLIAM H. PISANI, a citizen of the United States, and a resident of the city and county of San Francisco and State of California, have invented new and useful Processes of Packing Coffee, of which the following is a specification.

The invention relates to a process of packing or treating ground roasted coffee.

An object of the invention is to provide a process of packing coffee which produces coffee of a finer quality than present packing methods.

Another object of the invention is to provide a process of packing coffee which lessens the extraction of volatile matter from the packed coffee.

The invention possesses other advantageous features, some of which, with the foregoing, will be set forth at length in the following description, where I shall outline in full one method of carrying out my invention.

It has been observed heretofore that air has an oxidizing effect on ground roasted coffee which impairs the quality of the coffee and in order to remove the effect, the ground coffee has been packed in vacuumized receptacles. The packed coffee develops gases very slowly, which in several weeks' time fill the vacuumized space within the receptacle and even produce a pressure within the receptacle. Formerly, several weeks have been required for the development of a sufficient amount of these gases, to overcome the vacuum within the receptacle and during this time the coffee has been subjected to the low pressure of the vacuum. This reduction of pressure causes the volatilization of essential and aromatic substances in the coffee, thereby impairing the quality of the coffee and taking from it the "life" which is so desirable. These volatilized products are distinct from the gases which are developed within the coffee and which in time overcome the vacuum in the receptacle and produce a pressure therein.

In accordance with my process, I treat the filled vacuumized receptacles in such manner that the vacuum therein is quickly destroyed, so that the coffee is subjected to the low pressure of the vacuum for a relatively short time. The coffee bean is preferably roasted at a temperature of approximately 142° centigrade for a sufficient length of time to produce the desired color after which it is ground and placed in cans, the cans being preferably steamed before the coffee is placed in them. The filled cans are then vacuumized and sealed. The steps of grinding, screening, weighing and sealing are preferably performed in as rapid succession as possible and without undue exposure to the air, so that the coffee is impaired to the least possible extent.

The vacuum in the sealed vacuumized cans is then destroyed. This is preferably accomplished by subjecting the filled cans to heat, which facilitates and hastens the formation of the filling gases within the can. I have found that an excessive temperature at this stage of the process is deleterious to the quality of the finished product and that a temperature between 95° Fahr. and 100° Fahr., produces the best results. At this temperature, the vacuum within the can is destroyed and a pressure produced therein in between 48 and 72 hours, depending upon the coffee. A temperature below 95° Fahr. may be used, but such temperature will require a longer time to overcome the vacuum, and consequently will expose the coffee to the action of the vacuum for a longer time. The object of the invention is to overcome the vacuum and produce a pressure in the shortest possible time without in any manner impairing the quality of the coffee due to an excessive volatilization of the essential or aromatic substances, and I have found that a temperature approaching 100° Fahr. accomplishes the desired result. The pressure which is produced within the can should be such that after the can is removed from the heat and is allowed to cool, a pressure still remains. I prefer to leave the cans in the hot room until about 8# pressure to the square inch has been developed within the can, but the cans may be removed from the hot room when any desired condition of pressure exists therein.

During the time that the receptacle filling gases are being developed, a small amount of volatile matter is volatilized, but on account of the relatively short duration of the vacuum, the amount of volatile matter liberated from the coffee is small.

I claim:

1. The process of packing roasted coffee, which consists in vacuumizing and sealing a receptacle containing the coffee and then subjecting the filled receptacle to heat until sufficient gases have been developed within the receptacle to produce a pressure greater than atmospheric pressure therein.

2. The process of packing roasted coffee which consists in vacuumizing and sealing a receptacle containing the coffee and then heating the filled receptacle to a temperature approximating 100° Fahrenheit and maintaining it at said temperature until a pressure in excess of atmosphere is produced in the receptacle.

In testimony whereof I have hereunto set my hand at San Francisco, California, this 26th day of February, 1917.

WILLIAM H. PISANI.

In presence of—
H. G. Prost.